(12) United States Patent
Hannessen (10) Patent No.: US 11,814,252 B2
(45) Date of Patent: Nov. 14, 2023

(54) PALLETIZING SYSTEM AND METHOD OF PALLETIZING

(71) Applicant: Qimarox Patenten B.V., Harderwijk (NL)

(72) Inventor: Pieter Gerrit Hannessen, Harderwijk (NL)

(73) Assignee: Qimarox Patenten B.V., Harderwijk (NL)

( * ) Notice: Subject to any disclaimer, the term of this patent is extended or adjusted under 35 U.S.C. 154(b) by 0 days.

(21) Appl. No.: 18/003,435

(22) PCT Filed: Jun. 29, 2021

(86) PCT No.: PCT/NL2021/050406
§ 371 (c)(1),
(2) Date: Dec. 27, 2022

(87) PCT Pub. No.: WO2022/005277
PCT Pub. Date: Jan. 6, 2022

(65) Prior Publication Data
US 2023/0192423 A1    Jun. 22, 2023

(30) Foreign Application Priority Data
Jun. 29, 2020   (NL) .................................. 2025934

(51) Int. Cl.
*B65G 57/24*   (2006.01)
(52) U.S. Cl.
CPC ...... *B65G 57/24* (2013.01); *B65G 2201/0267* (2013.01)

(58) Field of Classification Search
CPC ........ B65G 57/24; B65G 57/02; B65G 57/03; B65G 57/035; B65G 57/06; B65G 57/112;
(Continued)

(56) References Cited

U.S. PATENT DOCUMENTS

| | | | | |
|---|---|---|---|---|
| 4,214,848 A | * | 7/1980 | Verwey | B65G 57/245 414/794.7 |
| 4,987,992 A | * | 1/1991 | Pfleger | B65G 17/18 D34/28 |

(Continued)

FOREIGN PATENT DOCUMENTS

| | | |
|---|---|---|
| DE | 102010011534 | 9/2011 |
| EP | 2537783 | 12/2012 |

(Continued)

*Primary Examiner* — Lynn E Schwenning
(74) *Attorney, Agent, or Firm* — Marcus C. Dawes (57) ABSTRACT

The invention relates to a palletizing system, comprising: a frame extending in an upright direction, an input configured to feed products, a forming device configured to form a layer of products, a palletizing device configured to place the layer of products onto a pallet, and a lift, configured to transport the layer of products along the upright extending frame from a level of the forming device to a level of the palletizing device, wherein the forming device and the palletizing device are arranged one directly above the other. It further relates to a method of palletizing, comprising the steps of feeding products to a forming device arranged on a first level; forming a layer of products by the forming device; transporting the layer of products to a second level; placing the layer of products onto a pallet by a palletizing device that is arranged at said second level; wherein the forming device and the palletizing device are arranged one directly above the other.

20 Claims, 5 Drawing Sheets

(58) Field of Classification Search
CPC ...... B65G 57/20; B65G 57/22; B65G 57/245; B65G 57/301; B65G 57/302; B65G 2201/0267
See application file for complete search history.

(56) References Cited

U.S. PATENT DOCUMENTS

| | | | | |
|---|---|---|---|---|
| 5,050,726 | A * | 9/1991 | Flagg | B65G 17/123 |
| | | | | 198/799 |
| 6,371,720 | B1 * | 4/2002 | Ouellette | B65G 57/005 |
| | | | | 414/791.6 |
| 6,511,281 | B2 * | 1/2003 | Graeler | B65G 57/035 |
| | | | | 414/792.8 |
| 7,736,120 | B2 * | 6/2010 | Pierson | B65G 57/24 |
| | | | | 414/788.9 |
| 7,850,415 | B2 * | 12/2010 | Blanc | B65G 57/24 |
| | | | | 414/791.1 |
| 9,073,709 | B2 * | 7/2015 | Magri | B65G 57/035 |
| 10,000,348 | B2 * | 6/2018 | Hannessen | B65G 57/00 |

FOREIGN PATENT DOCUMENTS

| | | |
|---|---|---|
| EP | 3025988 | 6/2016 |
| ES | 2615027 | 6/2017 |
| FR | 2436727 | 4/1980 |
| IT | MI941558 | 1/1996 |
| IT | MI20081787 | 4/2010 |

\* cited by examiner

PALLETIZING SYSTEM AND METHOD OF PALLETIZING

The present invention relates to a palletizing system and to a method of palletizing, in particular with such a system.

Applicant is manufacturer of different types of palletizing devices, which are offered in the main categories "low level infeed" and "high level infeed" palletizers. Such palletizing devices are part of a palletizing system, normally also comprising a forming device configured to arrange the products in a desired pattern or order in which they are to be placed by the palletizing device onto a pallet.

The palletizing devices belonging to the low level infeed category are characterized in that the pallet that is to be loaded with products is stationary during the process of placing products thereon, while the palletizing device transports layers of products to the upper level of the (partly loaded) pallet before said products are placed. Once an extra layer of products is placed onto the pallet, the palletizing device thus moves a height corresponding to one layer further upward to allow a next layer of products to be placed onto the pallet, i.e. on the uppermost layer of products that has just been placed. It is remarked that in relation to the present invention, a layer of products may be a single row of products, or a plurality of such rows.

The palletizing devices belonging to the high level infeed category are characterized in that the input of products to the palletizing device is and remains at a fixed level, and the pallet is gradually lowered relative to said input level after a layer of products has been placed onto the pallet or onto a layer of products previously placed onto the pallet. A mezzanine floor may be arranged at said fixed level of the palletizing device, thereby allowing easy access to the palletizing device.

All categories have specific use cases in which they are preferred, and related advantages and disadvantages. For example, a low level infeed palletizer has the advantage that it may be placed on one level inside a building, because it does not require an elevated operating plateau. It is therefore often easier to implement and consequently more cost efficient. To the contrary, a high level infeed palletizer is more complex and voluminous, requiring at least two levels inside a building. However, such a high level infeed palletizer will often have a higher capacity.

European patent application EP 2 537 783 A1, which is considered to define the closest prior art, discloses a device for lifting and unloading a layer of packs. At least the characterizing features of claim 1 are novel relative to EP 2 537 783 A1.

The documents EP 2 537 783 A1, FR 2 436 727 A1, ES 2 615 027 T3, EP 3 025 988 A1, IT MI 94 1558 A1, IT MI 20 081787 A1 and DE 10 2010 011534 A1 are acknowledged as further prior art.

There is an ongoing need to increase aspects such as versatility, flexibility and efficiency.

An objective of the present invention is to provide a palletizing system, that is improved relative to the prior art and wherein at least one of the above stated problems is obviated or alleviated.

Said objective is achieved with the palletizing system according to claim 1 of the present invention, comprising:
- a frame extending in an upright direction;
- an input configured to feed products in a feed direction;
- a forming device configured to form a layer of products;
- a palletizing device configured to place the layer of products onto a pallet;
- a lift, configured to transport the layer of products formed by the forming device along the upright extending frame from a level of the forming device to a level of the palletizing device; and
- wherein the forming device and the palletizing device are arranged one directly above the other.

The lift that is configured to transport the layer of products formed by the forming device from the level of the forming device to the level of the palletizing device, allows the forming device and the palletizing device to be arranged at different levels. This allows effective use to be made of different levels, i.e. stories or floors, in a building.

Moreover, by applying a forming device and a palletizing device that are arranged at different levels, the available working space around each of the forming device and the palletizing device may be greatly improved. For example, at the level of the forming device, operators may have ample space to move freely around the forming device, while also providing sufficient space for the supply of products that are to be arranged in layers by the forming device in preparation to the step of palletizing said products. Since this level is now dedicated to formation of layers of products, the specific level may also be optimized for this purpose. Likewise, the level of the palletizing device may be optimized for the step of placing the layers of products onto the pallet.

The lift also functions as a buffer, since it may pick up and temporarily store a layer of products formed by the forming device. In this way, the forming device may continue working, even when pallets are exchanged when a fully loaded pallet is transported away and a new empty pallet is to be placed below or on the palletizing device. In fact, during the process of moving a loaded pallet and positioning a new pallet, a total of three layers may be stored in the palletizing system: a first layer may be formed on the forming device, a second layer may be stored on the lift, and a third layer may be hold ready to be placed at the palletizing device.

The footprint of the palletizing system in the building is minimized if the forming device and the palletizing device are arranged one directly above the other. This allows the palletizing system to be arranged inside buildings having multiple stories or floors. Rather than the forming device and the palletizing device being arranged on the same floor and requiring a large footprint, the required space is now obtained in the height direction. Oftentimes it is not possible to extend a footprint of an existing building. In such cases the palletizing system according to the invention may allow an increase in palletizing capacity without requiring a larger building.

The palletizing system according to the invention thus improves versatility, flexibility and efficiency due to the forming device and the palletizing device being arranged at different levels, and the lift being configured to transport the layers from the level of the forming device to the level of the palletizing device. In particular, the palletizing system according to the invention provides an improved ratio between palletizing capacity and required footprint.

The advantage of an optimized ratio between palletizing capacity and required footprint in the building is obtained independent of the order of the forming device and the palletizing device. However, in view of other aspects, such as logistics, it may be preferred that the level of the palletizing device is at a higher level than the level of the forming device. In this case, a minimal footprint is obtained by arranging the palletizing device directly above the forming device, which is therefor a preferred embodiment of the invention.

The invention further relates to a method of palletizing, comprising the steps of:
- feeding products to a forming device arranged on a first level;
- forming a layer of products by the forming device;
- transporting the layer of products to a second level;
- placing the layer of products onto a pallet by a palletizing device that is arranged at said second level. The second level is different from the first level; and
- wherein the forming device and the palletizing device are arranged one directly above the other.

According to a preferred embodiment of the method, it comprises the step of using a palletizing system according to the invention.

Preferred embodiments are the subject of the dependent claims.

The various aspects and features described and shown in the specification can be applied, individually, wherever possible. These individual aspects, and in particular the aspects and features described in the attached dependent claims, may be an invention in its own right that is related to a different problem relative to the prior art.

In the following description preferred embodiments of the present invention are further elucidated with reference to the drawing, in which.

Like parts are numbered alike in the figures related to the different embodiments. The first embodiment will now be described in detail, and only the main differences of the further embodiments are discussed for FIGS. 2-4.

Figure 1A:
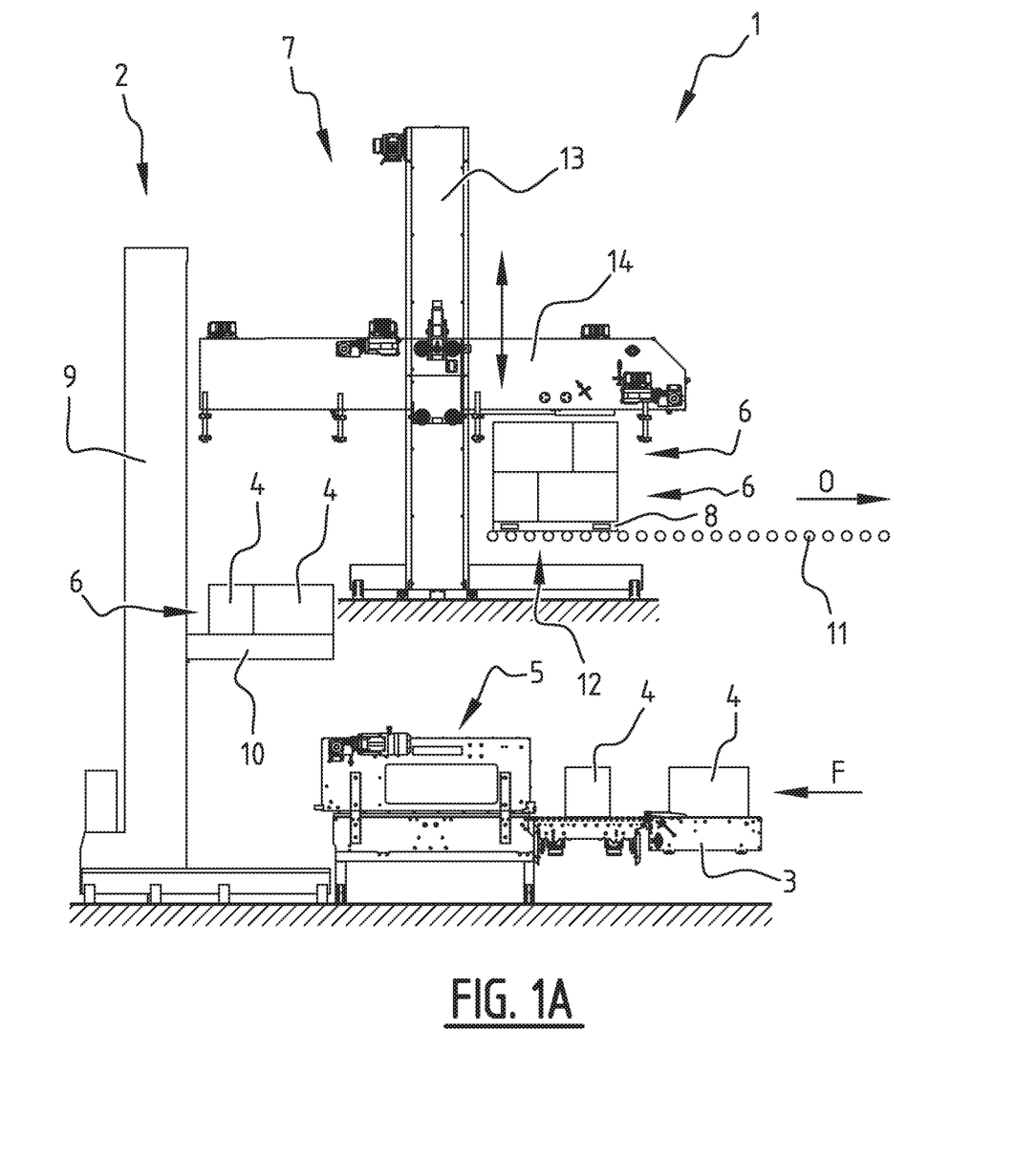
FIGS. 1A and 1B are side views of a palletizing system according to a first preferred embodiment, in two successive operating states.

The palletizing system 1 comprises a frame 2 that extends in an upright direction, and an input 3 configured to feed products 4 in a feed direction F. The palletizing system further comprises a forming device 5 configured to form a layer 6 of products 4, a palletizing device 7 configured to place the layer 6 of products 4 onto a pallet 8 and a lift 9. This lift 9 is configured to transport the layer 6 of products 4 formed by the forming device 5 along the upright extending frame 2 from a level of the forming device 5 to a level of the palletizing device 7. Lift 9 comprises a carrier 10 to support and transport the products 4.

It is remarked that the layer 6 may be a single row, or multiple rows, of products 4. In practice, layers 6 will normally comprise multiple rows of products 4, wherein the products 4 are positioned in a pre-determined pattern taking into account a pre-determined position and orientation for each product 4 to obtain an optimized loading of a pallet 8.

The palletizing system 1 further comprises a pallet support 12 configured to support the pallet 8 during loading thereof. In FIG. 1A, the input 3 feeds products 4 in the feed direction F toward the forming device 5. This forming device 5 is configured to position and orientate the products 4 relative to each other in a desired pattern, and thereby build a layer 6 of products 4. This layer 6 that has been formed by the forming device 5 is then moved onto the carrier 10 of the lift 9, and said lift 9 successively transports the layer 6 of products 4 along the upright extending frame 2 towards the level of the palletizing device 7, where the layer 6 is taken over by the palletizing device 7 before it is placed onto the pallet 8. In FIG. 1A, a pallet 8 supported on the pallet support 12 is finished and ready to be transported away via output 11. This transporting away of a loaded pallet 8 and positioning a new empty pallet 8 ready to be loaded with further products 4 takes time, and is a critical step in the palletizing process. The lift 9 proposes by the present invention is however not only functional to obtain a small footprint, but moreover contributes to the palletizing system 1 as a whole by functioning as a buffer. This is especially advantageous during exchange of pallets 8, but may also be effectively used to improve the efficiency and versatility of the palletizing system 1 during normal use. After all, the forming device 5 or the palletizing device 7 may, for maintenance, due to a malfunction, or simply because of a difference in capacity, temporarily not be able to meet the speed of the other device 5, 7. In such cases, the lift 9 may function as a buffer and prevent a total standstill.

Figure 1B:
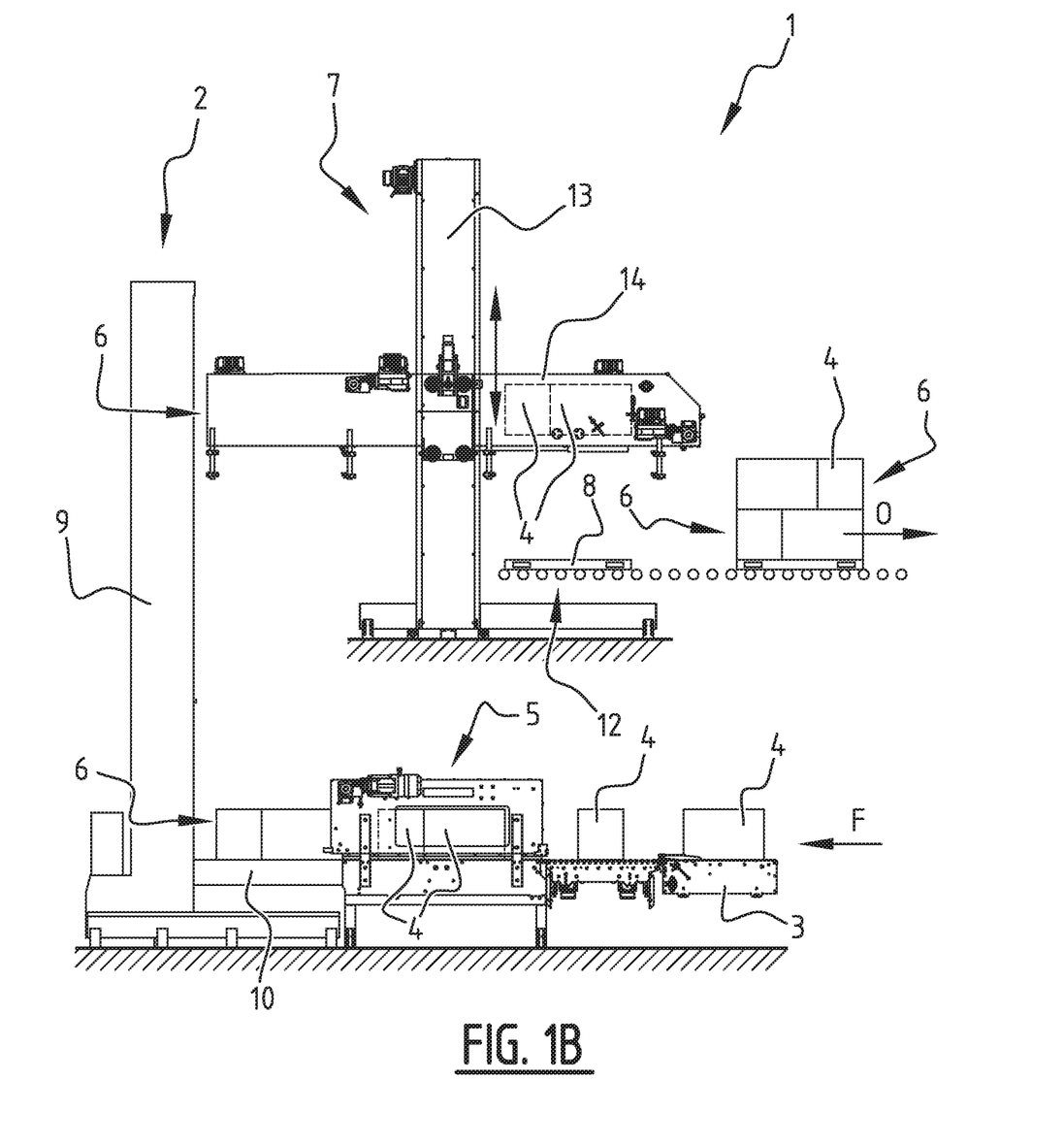

FIG. 1B shows the most critical step of an exchange of pallets 8, and illustrates how the forming device 5 may already form and store a new layer 6 of products 4, while both the lift 9 and the palletizing device 7 may hold two further layers 6 of products. Thus, during an exchange of pallets 8, already three layers 6 of products that are to be placed on the next pallet 8 may be prepared by the palletizing system 1.

The footprint of the palletizing system 1 in the building is minimized if the forming device 5 and the palletizing device 7 are arranged one directly above the other. This allows the palletizing system 1 to be arranged inside buildings having multiple stories or floors. Rather than the forming device 5 and the palletizing device 7 being arranged on the same floor and requiring a large footprint, the required space is now obtained in the height direction. Oftentimes it is not possible to extend a footprint of an existing building. In such cases the palletizing system 1 according to the invention may allow an increase in palletizing capacity without requiring a larger building.

The advantage of an optimized ratio between palletizing capacity and required footprint in the building is obtained independent of the order of the forming device 5 and the palletizing device 7. In view of other aspects, such as logistics, it is however preferred that the level of the palletizing device 7 is at a higher level than the level of the forming device 5. A minimal footprint is obtained if the palletizing device 7 is arranged directly above the forming device 5.

The palletizing system 1 further comprises an output 11 configured to output a pallet 8 loaded with at least one layer 6 of products 4. The output 11 is preferably arranged relative to the lift 9 on the same side as the input 3, as shown in FIGS. 1A, 1B, 2 and 4. In that case, the output direction O is directed transverse or opposite to the feed direction F. All embodiments shown in the FIGS. 1A, 1B, 2 and 4 show an output direction O that is opposite to the feed direction F, which provides the further advantage that the input 3 and output 11 may also be arranged one above the other, further contributing to a possible reduction in footprint of the whole logistic system upstream and downstream of the palletizing system 2.

Figure 3:
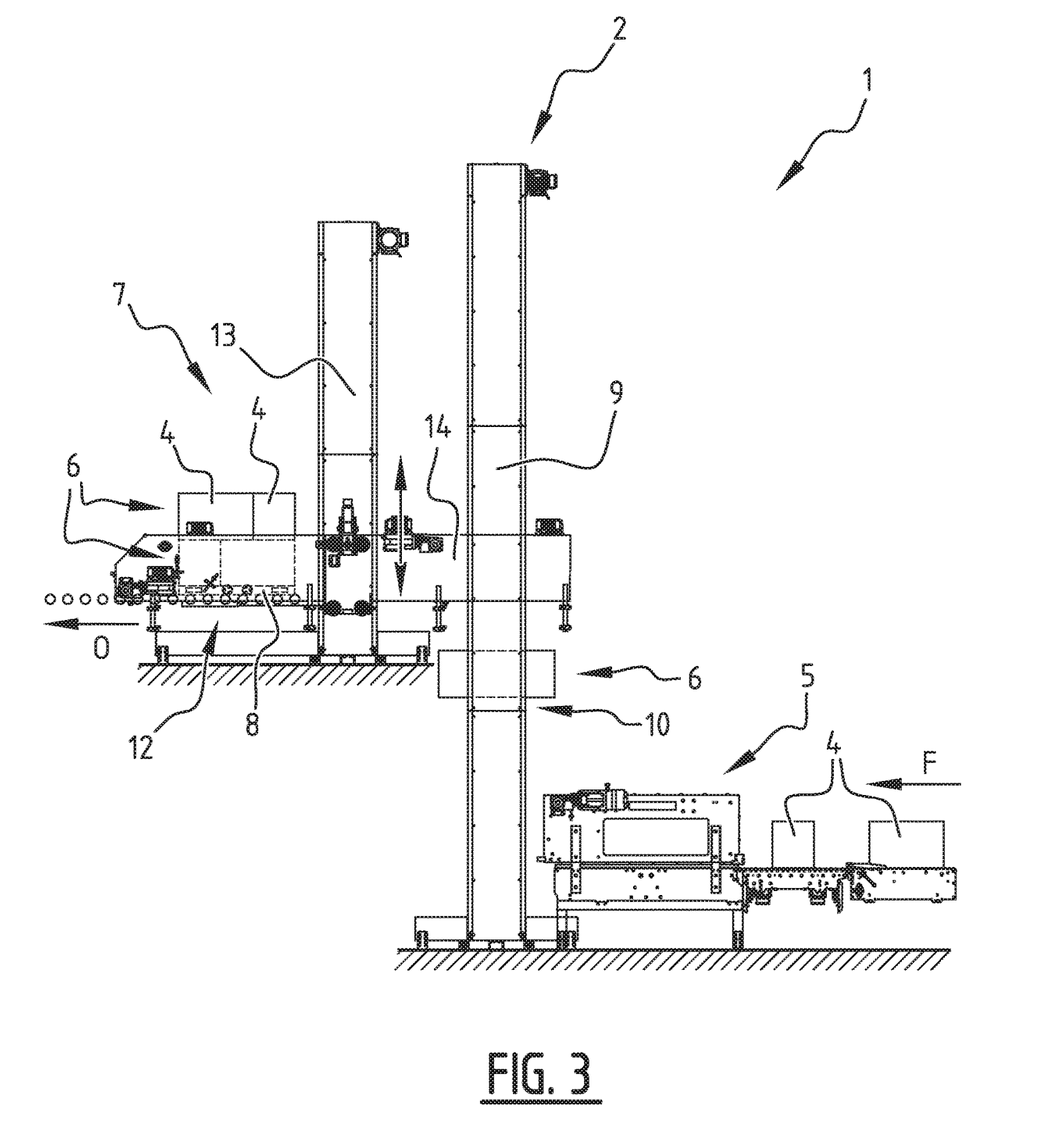
FIG. 3 is a side view of a palletizing system according to a third preferred embodiment.

In FIG. 3, showing an embodiment outside the scope of the present invention, the palletizing system 1 comprises a forming device 5 and a palletizing device 7 that are arranged on opposite sides relative to the lift 9, but still at different levels. In this configuration, the forming device 5 and the palletizing device 7 are arranged in-line and consequently the total footprint in the building is not optimized as will be obtained when the forming device and the palletizing device are arranged one directly above the other. The FIG. 3 embodiment may however still benefit from the advantages that each of the forming device 5 and the palletizing device 7 are arranged on independent levels that may be optimized for the specific purpose, also offering ample space around the respective devices 5, 7.

The palletizing system 1 may be embodied as different categories. According to a first category, the palletizing device 7 is height adjustable relative to the frame 9, and the pallet support 12 is fixed in height relative to the frame 9. This category has been described in the introduction as the "low level infeed" category, and is the subject of the preferred embodiments shown in FIGS. 1A, 1B, 2. The pallet support 12 may be formed by a conveyor that also defines the output 11.

Figure 2:
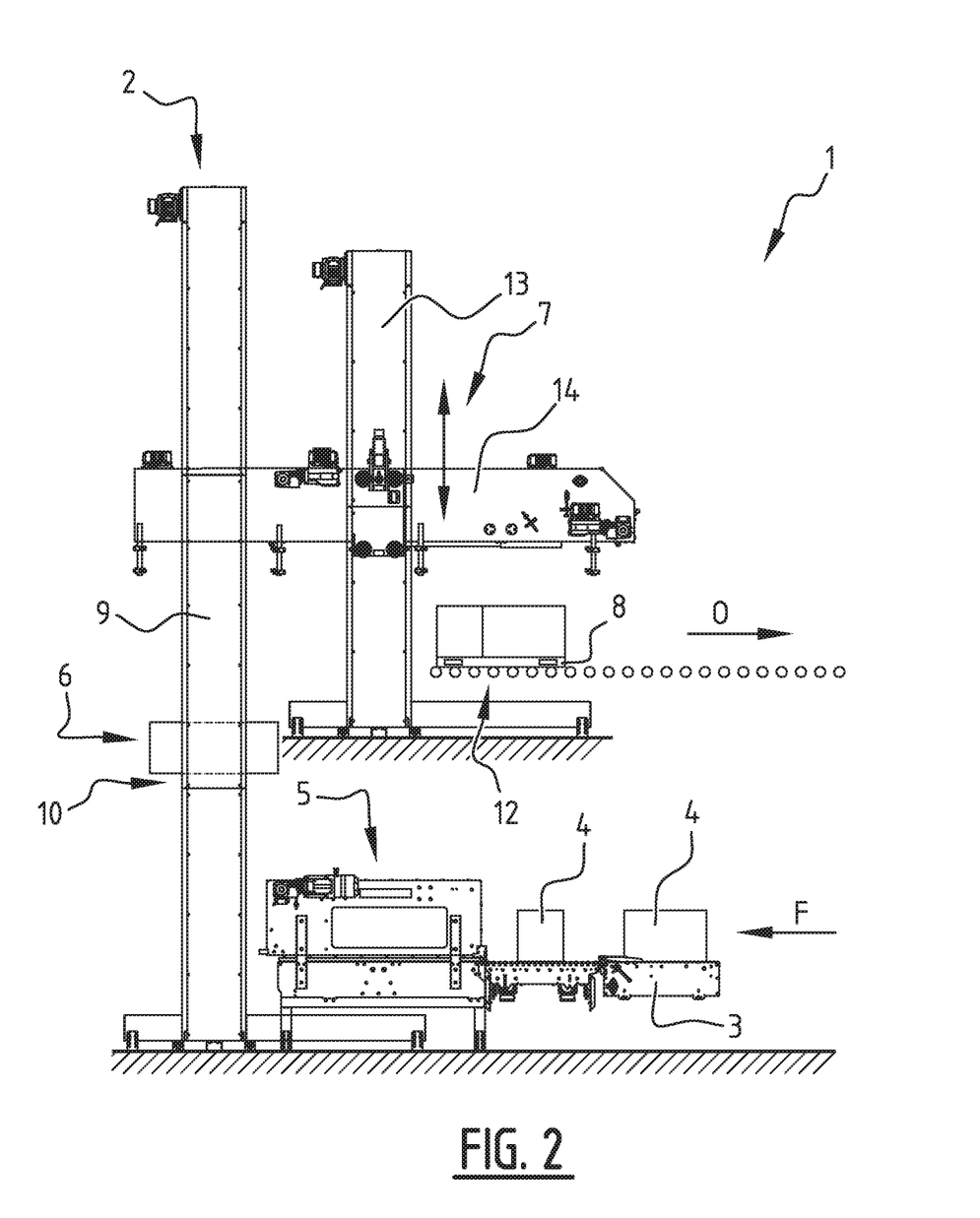
FIG. 2 is a side view of a palletizing system according to a second preferred embodiment.

The palletizing device 7 according to the first category may comprise an upright palletizer frame 13 and a lying palletizer sub frame 14. The lying palletizer sub frame 14 is height adjustable relative to the upright palletizer frame 13 and relative to the frame 9 of the palletizing system 1. In this way, the lying palletizer sub frame 14 may move a distance corresponding to a height of one layer upward after a layer 6 of products 4 has been places onto the pallet 8. Once a new, empty pallet 8 is provided, the lying palletizer sub frame 14 moves downward to start all over again.

According to a second category, the palletizing device 7 is fixed in height relative to the frame 9, and the pallet support 12 is height adjustable relative to the frame 9. This category has been described in the introduction as the "high level infeed" category, and is the subject of the preferred embodiment shown in FIG. 4. It is remarked that a palletizing device 1 according to this second high level infeed category may have similar configurations as the first low level infeed category. Also for this second category, an in-line configuration according to FIG. 3 and a different type of lift 9 according to FIGS. 1A and 1B may be applied.

Figure 4:
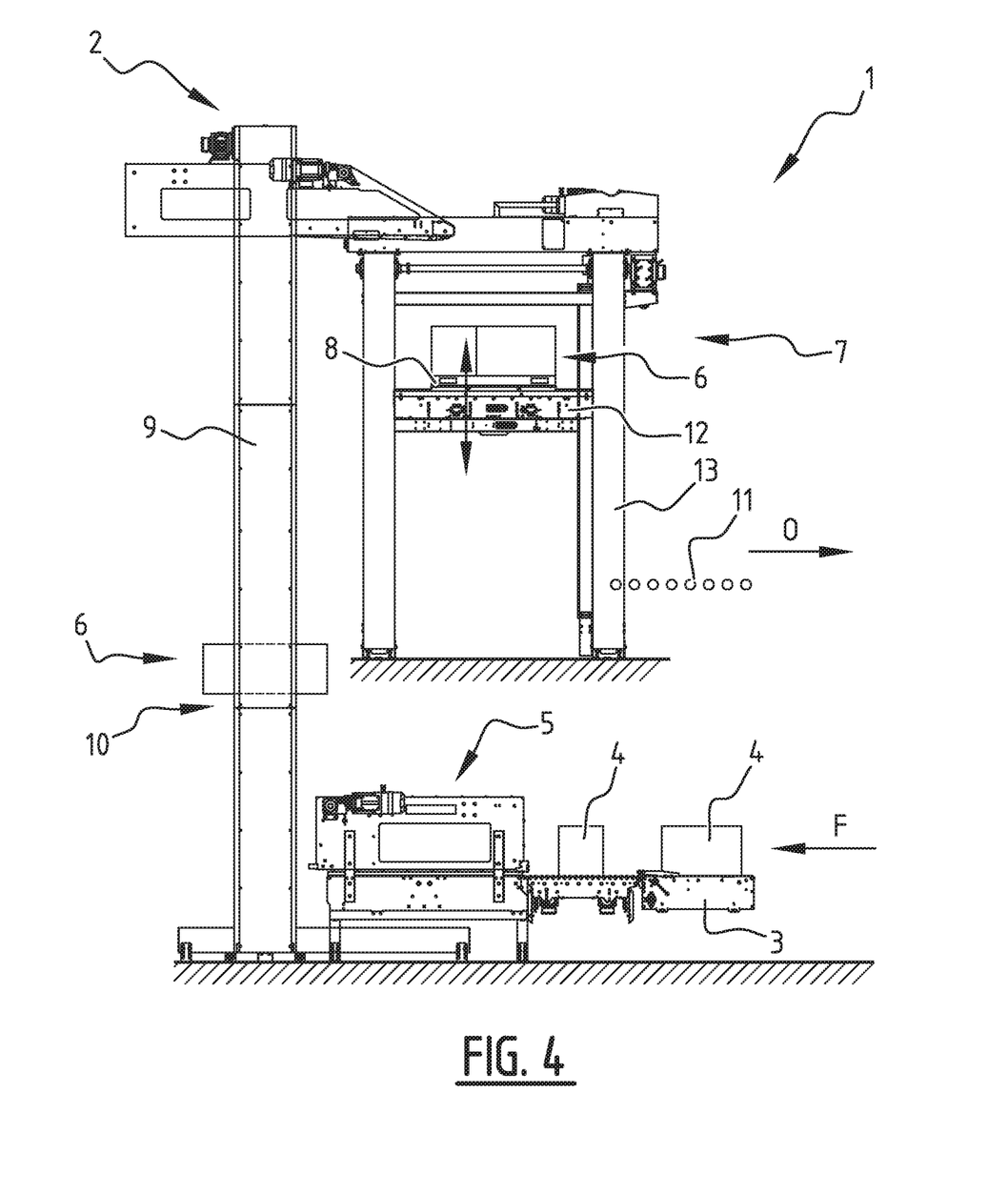
FIG. 4 is a side view of a palletizing system according to a fourth preferred embodiment.

The palletizing device 7 according to the second category comprises an upright palletizer frame 13, but now the pallet support 12 is height adjustable relative to the upright palletizer frame 13, and consequently also relative to the frame 9 of the palletizing system 1. The pallet support 12 moves the pallet 8 a distance corresponding to a height of one layer downward after a layer 6 of products 4 has been places onto the pallet 8.

For both the first and the second category, the frame 9 preferably extends between a first operator level at the level of the forming device 5 and a second operator level at the level of the palletizing device 7.

For the second category, the palletizing system 1 may comprise a further operator level intermediate the level of the forming device 5 and the level of the palletizing device 7. Said further operator level is preferably arranged at or near a level of the output 11.

The invention further relates to a method of palletizing, i.e. placing products 4 onto a pallet 8, said method comprising the steps of:
- feeding products 4 to a forming device 5 arranged on a first level;
- forming a layer 6 of products 4 by a forming device 5;
- transporting the layer 6 of products 4 to a second level; and
- placing the layer 6 of products 4 onto a pallet 8 by a palletizing device 7 that is arranged at said second level.

According to a preferred embodiment, said method comprises the step of using a palletizing system 1 according to the invention.

Although they show preferred embodiments of the invention, the above described embodiments are intended only to illustrate the invention and not to limit in any way the scope of the invention. Accordingly, it should be understood that where features mentioned in the appended claims are followed by reference signs, such signs are included solely for the purpose of enhancing the intelligibility of the claims and are in no way limiting on the scope of the claims. Furthermore, it is particularly noted that the skilled person can combine technical measures of the different embodiments. The scope of the invention is therefore defined solely by the following claims.

The invention claimed is:

1. Palletizing system, comprising:
   a frame extending in an upright direction from a first level to a second level;
   an input configured to feed products in a feed direction;
   a forming device configured to form a layer of products, wherein the forming device is disposed on the first level;
   a palletizing device configured to place the layer of products onto a pallet, wherein the palletizing device is disposed on the second level; and
   a lift, configured to transport the layer of products formed by the forming device along the upright extending frame from the first level of the forming device to the second level of the palletizing device,
   wherein the forming device on the first level and the palletizing device on the second level are arranged one directly above the other.

2. The palletizing system according to claim 1, wherein the level of the palletizing device is at a higher level than the level of the forming device.

3. The palletizing system according to claim 2, wherein the palletizing device is arranged directly above the forming device.

4. The palletizing system according to claim 1, further comprising an output configured to output the pallet loaded with at least one layer of products, wherein:
   said output is arranged relative to the lift on the same side as the input; and
   the output direction is directed transverse or opposite to the feed direction.

5. The palletizing system according to claim 4, further comprising a pallet support configured to support the pallet during loading thereof.

6. The palletizing system according to claim 5, wherein:
   the palletizing device is fixed in height relative to the frame; and
   the pallet support is height adjustable relative to the frame.

7. The palletizing system according to claim 1, further comprising a pallet support configured to support the pallet during loading thereof.

8. The palletizing system according to claim 7, wherein:
   the palletizing device is height adjustable relative to a palletizer frame disposed on the second level; and
   the pallet support is fixed in height relative to the frame.

9. The palletizing system according to claim 8, wherein the frame extends between a first operator level at the first level of the forming device and a second operator level at the second level of the palletizing device.

10. The palletizing system according to claim 9, comprising a further operator level intermediate the first level of the forming device and the second level of the palletizing device.

11. The palletizing system according to claim 10, wherein said further operator level is arranged at or near a level of an output.

12. The palletizing system according to claim 7, wherein:
the palletizing device is fixed in height relative to the frame; and
the pallet support is height adjustable relative to the frame.

13. The palletizing system according to claim 12, wherein the frame extends between a first operator level at the first level of the forming device and a second operator level at the second level of the palletizing device.

14. The palletizing system according to claim 12, comprising a further operator level intermediate the first level of the forming device and the second level of the palletizing device, wherein said further operator level is arranged at or near a level of an output.

15. A method of palletizing, comprising the steps of:
feeding products to a forming device arranged on a first level;
forming a layer of products by the forming device;
moving the layer of products onto a lift;
transporting the layer of products on the lift along a frame extending in an upright direction from the first level to a second level;
transferring the layer of products from the lift to a palletizing device that is arranged at the second level; and
placing the layer of products onto a pallet by the palletizing device, the pallet being that is arranged at the second level;
wherein the forming device on the first level and the palletizing device on the second level are arranged one directly above the other.

16. The method according to claim 15, comprising the step of using a palletizing system comprising:
a frame extending in an upright direction;
an input configured to feed products in a feed direction;
a forming device configured to form a layer of products;
a palletizing device configured to place the layer of products onto a pallet; and
a lift, configured to transport the layer of products formed by the forming device along the upright extending frame from a level of the forming device to a level of the palletizing device.

17. A palletizing system, comprising:
a frame extending in an upright direction from a first level to a second level;
an input configured to feed products in a feed direction;
a forming device configured to form a layer of products, wherein the forming device is disposed on the first level;
a palletizing device configured to place the layer of products onto a pallet, wherein the palletizing device is disposed on the second level; and
a lift, configured to transport the layer of products formed by the forming device along the upright extending frame from the first level of the forming device to the second level of the palletizing device,
wherein the forming device on the first level and the palletizing device on the second level are arranged one directly above the other, wherein the palletizing device is arranged directly above the forming device, further comprising an output configured to output the pallet loaded with at least one layer of products, wherein:
said output is arranged relative to the lift on the same side as the input; and
the output direction is directed transverse or opposite to the feed direction.

18. The palletizing system according to claim 17, further comprising a pallet support configured to support the pallet during loading thereof.

19. The palletizing system according to claim 18, wherein the frame extends between a first operator level at the first level of the forming device and a second operator level at the second level of the palletizing device.

20. The palletizing system according to claim 19, comprising a further operator level intermediate the level of the forming device and the level of the palletizing device, wherein said further operator level is arranged at or near a level of an output.

* * * * *